(12) United States Patent
Sharma et al.

(10) Patent No.: US 7,136,189 B2
(45) Date of Patent: Nov. 14, 2006

(54) COLOR HALFTONING USING A MULTI-LEVEL SUCCESSIVE-FILLING HALFTONE SCREENING ALGORITHM

(75) Inventors: Gaurav Sharma, Webster, NY (US); Helen H. Shin, Fairport, NY (US); Shen-Ge Wang, Fairport, NY (US); Zhigang Fan, Webster, NY (US)

(73) Assignee: Xerox Corporation, Stamford, CT (US)

( * ) Notice: Subject to any disclaimer, the term of this patent is extended or adjusted under 35 U.S.C. 154(b) by 873 days.

(21) Appl. No.: 10/040,546

(22) Filed: Jan. 7, 2002

(65) Prior Publication Data

US 2003/0128395 A1 Jul. 10, 2003

(51) Int. Cl.
*G06F 15/00* (2006.01)
(52) U.S. Cl. .................. 358/1.9; 358/534; 358/502; 347/15; 347/43; 347/251
(58) Field of Classification Search .................. 358/1.9, 358/534, 535–536, 3.2, 3.13, 2.1, 502, 456; 347/15, 43, 251; 345/589–590; *H04N 1/52, H04N 1/405*
See application file for complete search history.

(56) References Cited

U.S. PATENT DOCUMENTS

| | | | |
|---|---|---|---|
| 4,149,194 A | 4/1979 | Holladay | |
| 5,363,318 A | 11/1994 | McCauley | |
| 5,631,748 A | 5/1997 | Harrington | |
| 5,673,121 A | 9/1997 | Wang | |
| 6,072,591 A | 6/2000 | Harrington | |

OTHER PUBLICATIONS

Joseph Shu, Chia-Hsin Li, Hakan Ancin, Anoop Bhattacharjya, "Color Stochastic Screening with Smoothness Enhancement", IS&T's NIP 13: 1997 International Conference on Digital Printing Technologies.

Balasubramanian, Raja "Optimization of the Spectral Neugebauer Model for Printer Characterization", *Journal of Electronic Imaging*, Apr. 1999, vol. 8(2), pp. 156-166.

Balasubramanian, Raja and Maltz, Martin S., "Refinement of printer transformations using weighted regression", SPIE, vol. 2658, 0-8194-2032, Aug. 1996, pp. 334-340.

*Primary Examiner*—Edward I. Celeste
*Assistant Examiner*—Heather D Gibbs
(74) *Attorney, Agent, or Firm*—Fay, Sharpe, Fagan, Minnich & McKee, LLP

(57) ABSTRACT

A method is provided for rendering a color image with a plurality of separations with a multi-level successive-filling halftoning process using a single screen for a plurality of separations. For a separation to be processed, first, from the possible multiple levels for the separation, the set of levels that would be used and the number of dots corresponding to the different levels are decided. These decisions are based on the input level for the separation and input levels for the prior process separations. The location of the dots to be printed for the different levels for the separation is then decided by using the halftone screen, while simultaneously taking into account the placement of printed dots for the prior separations. The selection is done so as to best disperse dots and minimize overlap.

12 Claims, 5 Drawing Sheets

COLOR HALFTONING USING A MULTI-LEVEL SUCCESSIVE-FILLING HALFTONE SCREENING ALGORITHM

FIELD OF THE INVENTION

The subject invention pertains to the art of color image/text printing or display systems, and is especially applicable to a method and apparatus wherein color halftoning (representing a continuous tone image with a binary representation) is implemented with a single stochastic screen for maximal ink dispersion and optimized spatial frequency response in the printing or display process. The invention is particularly applicable in obtaining improved results in halftone smoothness and reduced granularity in the highlight regions in comparison to independent per-separation screens.

BACKGROUND OF THE INVENTION

In today's business and scientific world color has become essential as a component of communication. Color facilitates the sharing of knowledge and ideas. Companies involved in the development of digital color print engines are continuously looking for ways to improve the accuracy and total image quality of their products.

Color images are commonly represented as one or more separations, each separation comprising a set of color density signals for a single primary or secondary color. Color density signals are commonly represented as digital gray or contone pixels, varying in magnitude from a minimum to a maximum, with a number of gradients between corresponding to the bit density of the system. Thus, a common 8 bit system provides 256 shades of each primary color. A color can therefore be considered the combination of magnitudes of each pixel, which when viewed together, present the combination color Usually, printer signals include three subtractive primary color signals (Cyan, Magenta and Yellow) and a Black signal which together can be considered the printer colorant signals. Each color signal forms a separation and when combined together with the other separations, forms the color image.

Printers commonly provide a limited number of output possibilities, and are commonly binary, i.e., they produce either a dot (ink drop) or no dot at a given pixel location. Thus, given a color separation with 256 shades of each additive primary color, a set of binary printer signals must be produced representing the contone effect. This process is referred to as halftoning. In such arrangements, over a given area and the separation having a number of contone pixels therein, each pixel value of an array of contone pixels within the area is compared to one of a set of preselected thresholds (the thresholds may be stored as a dither matrix and the repetitive pattern generated by this matrix is considered a halftone cell) as taught for example in U.S. Pat. No. 4,149,194 to Holladay. The effect of such an arrangement is that, for an area where the image is a contone, some of the thresholds in the matrix will be exceeded, i.e., the image value at that specific location is larger than the value stored in the dither matrix for that same location, while others are not. In the binary case, the pixels or cell elements for which the thresholds are exceeded might be printed as Black or some color, while the remaining elements are allowed to remain white or uncolored, dependent on the actual physical quantity described by the data. Since the human visual system tends to average out rapidly varying spatial patterns and perceives only a spatial average of the micro-variation in spot-color produced by a printer, the halftone process described above can be used to produce a close approximation to the desired color in the contone input.

The dither matrix of threshold values is often referred to as a "screen", and the process of generating the binary image from the contone image using the screen is called "screening". Conventional digital halftones start as a number of isolated dots which grow bigger as more colorant is requested on the paper. These screens are referred to as clustered-dot screens. The fundamental rate at which the dots in a clustered dot screen are repeated is commonly referred to as the screen's spatial frequency [Note R. Ulichney, "Digital Halftoning", MIT Press, Cambridge, Mass., 1987]. The higher the screen spatial frequency, the finer and smoother appearing the image and also the greater is the capacity for the dots to represent fine detail in the image. Dithering creates problems in color document reproduction where the repeating pattern of a screen through the image, when superposed over similar repeating patterns in multiple separations, can cause moiré or other artifacts, particularly in a printing system with less than ideal registration between separations.

Stochastic, or non-periodic screening is an alternative to conventional clustered dot screens. Instead of producing dots that grow with increased colorant on paper, the stochastic screening method produces a well-dispersed pattern of isolated dots at spaced pixel locations. Thus there is no fundamental periodicity in the dots, instead the design of the screen attempts to produce patterns with pleasant noise characteristics. The pleasant noise characteristics are achieved by designing the screen so as to distribute the noise energy in the region of high spatial frequency, where the human visual system has a significantly reduced sensitivity. In this respect, U.S. Pat. No. 5,673,121 to Wang, discloses a stochastic halftone screening method for designing an idealized stochastic screen and is herein incorporated by reference as it discloses a particular stochastic screen useful in implementation of the subject invention, as will be more fully explained below. One of the advantages of stochastic, or non-periodic screening over periodic screening, is the suppression of moiré.

Color stochastic screening has typically been implemented in the prior art by using the same screen for all separations (dot-on-dot) or by using independent screens (possibly obtained by shifting/rotating/flipping a single screen). These methods do not produce halftones with maximal ink dispersion and optimized spatial frequency response because there is no control of interseparation overlaps. The less successful the screening processes, the less smooth, i.e. more grainy, the resultant image appears. It is of course an overall objective of the subject invention to produce a resultant image in which the graininess is minimized, smoothness is enhanced and the intended colors are accurately reproduced. Related methods have been proposed for error diffusion and screening in U.S. Pat. No. 6,072,591 and in U.S. Pat. No. 5,631,748 to Harrington, and in the publication "Color Stochastic Screening with Smoothness Enhancement", by J. Shu, C. H. Li, H. Ancin, and A, Bhattarcharjya, IS&T's NIP13: 1997 International Conference on Digital Printing Technologies.

Another problem relates to the smooth reproduction of highlight regions which is a challenge for most halftone printers. A highlight region is typically a color which is fairly close to white, e.g., a pale sand or pale gray color. Bi-level halftoning for highlight regions is particularly susceptible to graininess problems. In order to reduce visibility of halftone textures in highlight regions, a number of printing technologies utilize multiple printing levels per colorant. This is achieved either by using light and dark inks or by using a small drop-size and allowing multiple drops per pixel (multi-level halftoning). The lighter inks/smaller drops reduce the amount of luminance variation produced by the printed dots and thus produce highlight regions that have less visible halftone texture than those produced with darker colorants or larger drops. For photo-quality inkjet printing, this is increasingly becoming the predominant mode of printing as compared to bi-level halftoning and has been a strong driver of the evolution of inkjet printing technology.

While multi-level halftoning offers an inherent benefit over bi-level halftoning in reducing luminance variation in the highlights, the halftone texture visibility is still strongly influenced by the interactions between the different printed separations. Halftoning the different separations using the same halftone screen in a "dot-on-dot" configuration gives rise to the largest possible variation in luminance and therefore the most visible halftone textures. The more typical configuration of independent halftone screens for the different separations performs better but still exercises only limited control over inter-separation overlap.

Accordingly, there is a need for a halftoning algorithm for multi-level halftoning that utilizes a single halftone screen but achieves improved control of the interaction between halftone separations by utilizing a successive-filling algorithm for multi-level halftoning. The algorithm should give rise to smoother halftone textures and better ink dispersion than what is achieved with don-on-dot or independent screens

BRIEF SUMMARY OF THE INVENTION

The invention proposes a successive-filling technique for use with multi-level halftoning and printing. The technique results in improved halftone smoothness and reduced granularity in the highlight regions in comparison to independent per-separation screens.

The subject invention describes a method for multi-level halftoning and printing a color image using a successive-filling stochastic screen by simultaneously factoring multi-level aspects and successive-filling aspects in the processing algorithm to better compute the number of ink drops and their location. The algorithm achieves the goals of smoother halftone textures and better ink dispersion of printed dots for different separations, and results in an output image with good spatial frequency characteristics for the combinations of the separations.

For the separation to be processed, first, from the possible multiple levels for the separation, the set of levels that will be used are decided and the number of dots corresponding to the different levels is decided. This decision is based on the input level for the separation and input levels for the prior processed separations. The location of the dots to be printed for the different levels for the separation is then decided by using the halftone screen, while simultaneously taking into account the placement of printed dots for the prior separations. The selection is done so as to best disperse the dots and minimize overlap.

In accordance with the present invention, in a color printing system, a method is provided for printing a color document with a multi-level halftone process using a single screen for a plurality of color separations The screen is comprised of a plurality of pixel locations associated with successive threshold values. The method comprises printing at least one of the color separations with a selected number of ink drops per pixel location determined by input, color and value, a maximum number of ink drops allowed per pixel and locations of previously printed colorants. The printing of more than one ink drop per pixel location for the at least one color separation is at pixel locations successively disposed within a range of the threshold values successive to the locations of the previously printed colorants. More particularly, the printing of more than one ink drop per pixel location comprises filling a remaining level of the at least one color separation at pixel locations with successive threshold values already having a base level of the one color separation.

One advantage of the present invention is a color halftoning process which enhances smoothness of image display by producing halftones with maximal ink dispersion and optimized spatial frequency response.

It is another advantage of the subject invention that a stochastic screening using the same screen for all separations provides a more expeditious processing for halftoning a color image.

Yet another advantage of the present invention is a system for simultaneously combining multi-level processing techniques with successive filling of a stochastic screen for improved ink drop placement and image printing.

Other advantages and benefits of the present invention will become apparent to those of ordinary skill in the art upon a reading and understanding of the following detailed description of the preferred embodiments.

BRIEF DESCRIPTION OF THE DRAWINGS

The invention may take form in various components and steps and arrangements of components and steps. The drawings are only for purposes of illustrating the preferred embodiments and are not to be construed as limiting the invention Where.

DETAILED DESCRIPTION OF THE PREFERRED EMBODIMENT

Figure 1:
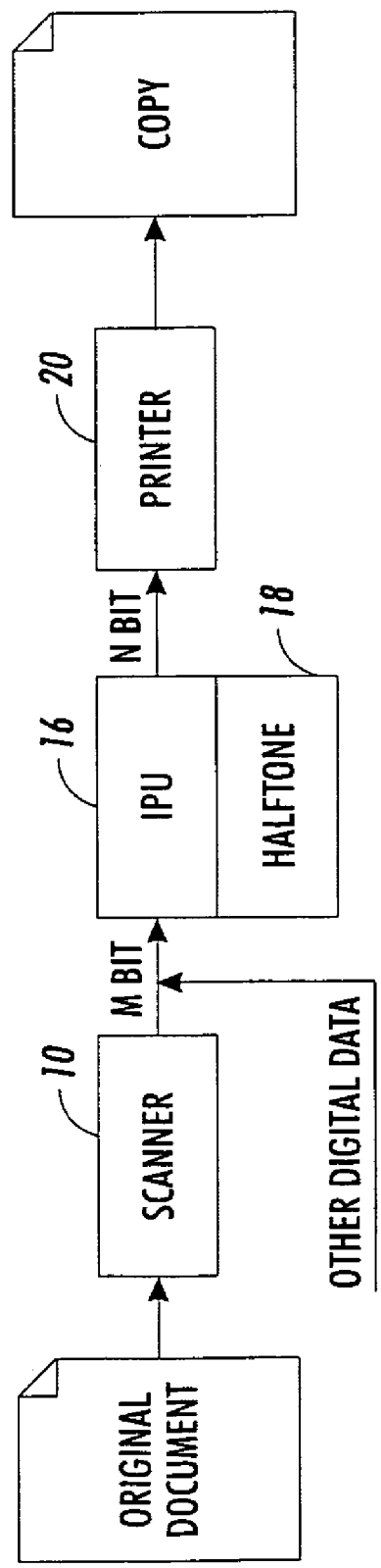
FIGS. 1 and 2 represent a halftoning system in which the present invention finds use.

To Referring now to the drawings wherein the showings are for purposes of illustrating preferred embodiments of the invention only and not for limiting same, the invention describes a way of halftoning a color image using multi-level ink drop processing techniques in combination with a single successive-filling stochastic screen. The different separations are processed in order of decreasing luminance modulation (i.e., successive separations produce smaller and smaller changes in luminance, for printing this order is from the darkest printing separation to the lightest) and are biased so as to target different thresholds of the stochastic screen. The biasing is done so as to achieve three objectives: (1) "area coverage" for each color is preserved, (2) the inks are maximally dispersed, i.e., there is no overlap unless necessary and overlap of lighter inks occurs before overlap of darker inks, and (3) the spatial frequency optimization of the stochastic screen is used optimally by having the darkest dots occupy the lowest thresholds, for the particular enhancement of smoothness in highlight color regions.

A feature of this invention is to process the image separations in order of decreasing luminance modulation, for a CMYK printer this order is typically K, M, C, Y. For each separation, the number of dots printed is decided by the input digital value for that separation and the placement of the dots is done so as to have the dots first fill-in regions of highest luminance and then move to regions of successively decreasing luminance For the multi-level aspect of the invention, a base level for the colorant is first applied before a remaining level is applied, both applications being made in accordance with the screen. In each region of constant luminance, the dots are placed so as to occupy the lowest available thresholds in the stochastic screen first. Since the screen is designed to have optimal frequency response when the lower levels are filled first, this method ensures that the darkest dots occupy the regions with the best frequency response characteristics. The above goals are achieved by halftoning each separation using the same basic stochastic screen for both the successive-filling and the multiple level applications. The description of the algorithm below will illustrate this idea more clearly. For the present description, the example of an 8-bit CMYK image is used, though the method could be generalized to any number of bits and other printing inks. Furthermore, the invention is described as using a 256×256 stochastic screen for explanation, any size stochastic screen can be used in practice.

The stochastic screen is designed in accordance with the method described in U.S. Pat. No. 5,673,121 to Wang. This method optimizes the screen spatial frequency characteristics, when it is filled successively starting from a threshold of 1 and moving up to a level of 255. Thus, the pixel pattern with thresholds 1 and 2 filled up has a more "pleasing" distribution of dots than the pattern with thresholds 1 and 255 filled up, even though they have exactly the same number of pixels turned on (the latter claim is due to the linearity of the dot).

The eye is more sensitive to high frequency variations in luminance than to variations in chrominance. In order to obtain a more uniform luminance distribution, it is desirable to have the dots for the different separations well dispersed with minimal overlap between separations. In addition to the requirement for minimizing overlap, based on the characteristics of the stochastic screen mentioned above, the spatial distribution of the dots will be pleasing if the dots for all the printed separations are placed at the pixel locations corresponding to the lowest thresholds that they can occupy. Furthermore, the dots with the lowest luminance are placed at the lowest threshold levels because their spatial distribution will cause the most visible variation in luminance.

With reference now to FIG. 1, which shows general system requirements representing the goal of the invention, an electronic representation of an original document (an image) from an image input terminal such as scanner 10 derives electronic digital data in some manner, in a format related to the physical characteristics of the device, and commonly with pixels defined at m bits per pixel Common color scanners, such, for example, Xerox 5775 Digital Color Copiers, or the Pixelcraft 7650C, produce 8 bit/pixel data, at resolutions acceptable for many purposes. Since this is a color document, the image is defined with two or more separation bitmaps, usually with identical resolution and pixel depth. The electronic image signals are directed through an image processing unit (IPU) 16 to be processed so that an image suitable for reproduction on image output terminal or printer 20 is obtained. Image processing unit 16 commonly includes a halftone processor 18 which converts m level digital image signals to n level digital image signals, suitable for driving a particular printer, where m and n are integer values. It is also well within the contemplation of the present invention, to derive images electronically. In such cases, the images may be represented by a page description language file, describing the appearance of the page. In such a case, the IPU might include a processing element for decomposition of the page, and color conversions elements for providing appropriate signals for driving a printer.

Figure 2:
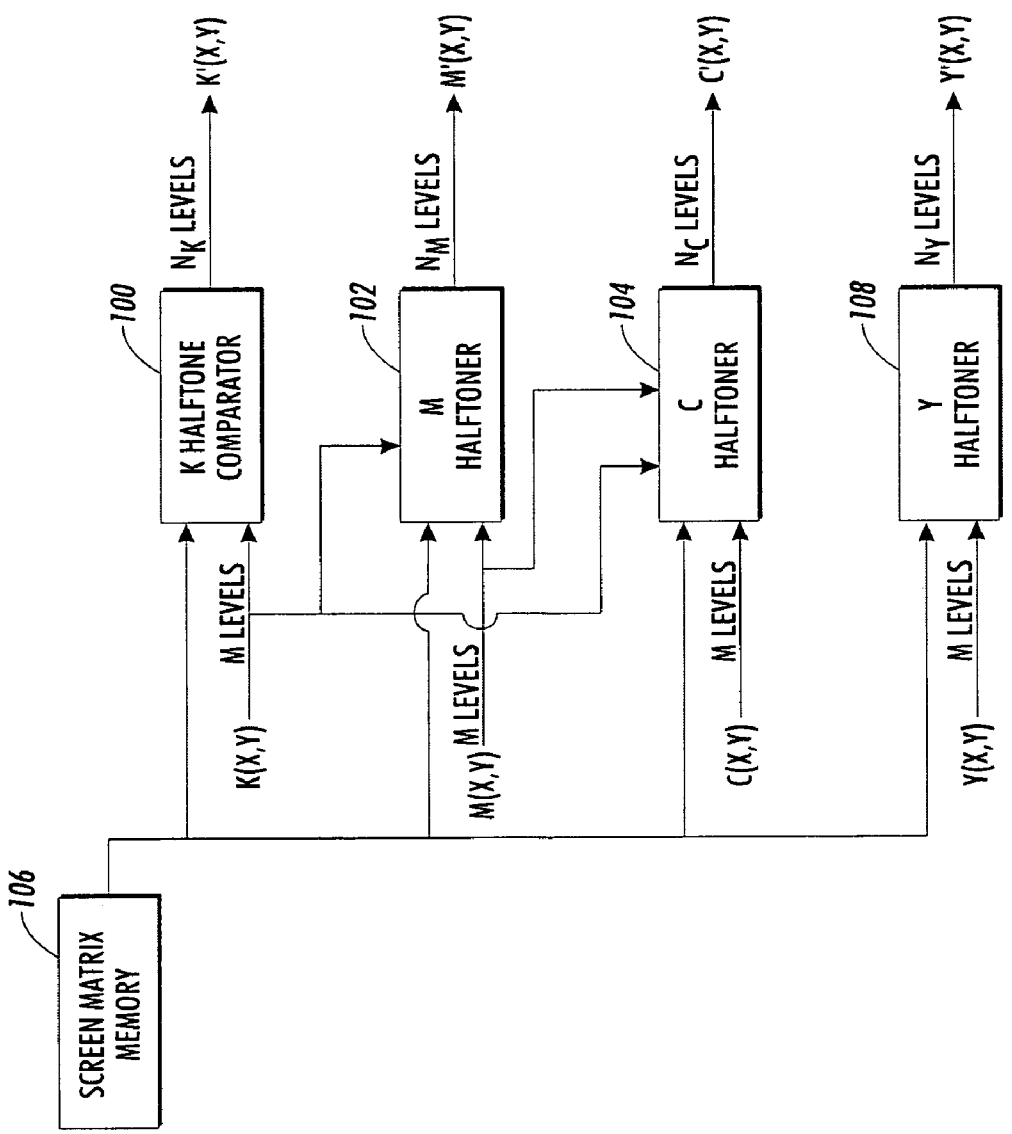

FIG. 2 shows the halftone processor 18 operational characteristics. In this example, there is illustrated a color processing system, using four separations, C(x, y), M(x,y), Y(x,y), K(x,y), obtained and each processed independently for halftoning purposes to reduce m-level inputs to $n_C$, $n_M$, $n_Y$, and $n_K$ level outs for the C, M, Y, and K separations, respectively. It will be appreciated that the invention is also applicable to the "single separation" or Black and white reproduction situation as well. Accordingly, a source of screen matrix information is shown, screen matrix memory 106, which provides one input to each comparator 100, 102, 104, 106 and 108 for each separation, where the other comparator is the m bit separation bitmap. The output is m bit output, which can be directed to a printer The preferred embodiment of the invention will now be described with respect to printing with Cyan, Magenta, Yellow, and Black (CMYK) colorants with multiple levels each of C and M. It will be assumed that the printing is controlled by providing an image with continuous tone CMYK values for each pixel, from which, the levels to be used for the multi-level colorants and the placement of printed dots is to be decided. The Yellow colorant is the least problematic in terms of producing undesirable visible texture and unwanted absorptions in combination with the Cyan and Magenta colorants, therefore, it will be assumed that the Yellow colorant is treated independently. A strategy for handling the Yellow to minimize interactions with Black will be described in the final algorithm. The algorithm will be described in terms of the halftoning for C, M, and K colorants. The colorant order for these will be assumed to be K, M, C—though other orderings are also possible and may be beneficial in specific cases. For the description, it will also be assumed that the halftone screen is a stochastic screen such as one designed using the procedure described in U.S. Pat. No. 5,673,121 to Wang, though the algorithm can be applied to other halftone screens as well.

Multi-Level Successive Filling Halftoning Algorithm

Figure 4:
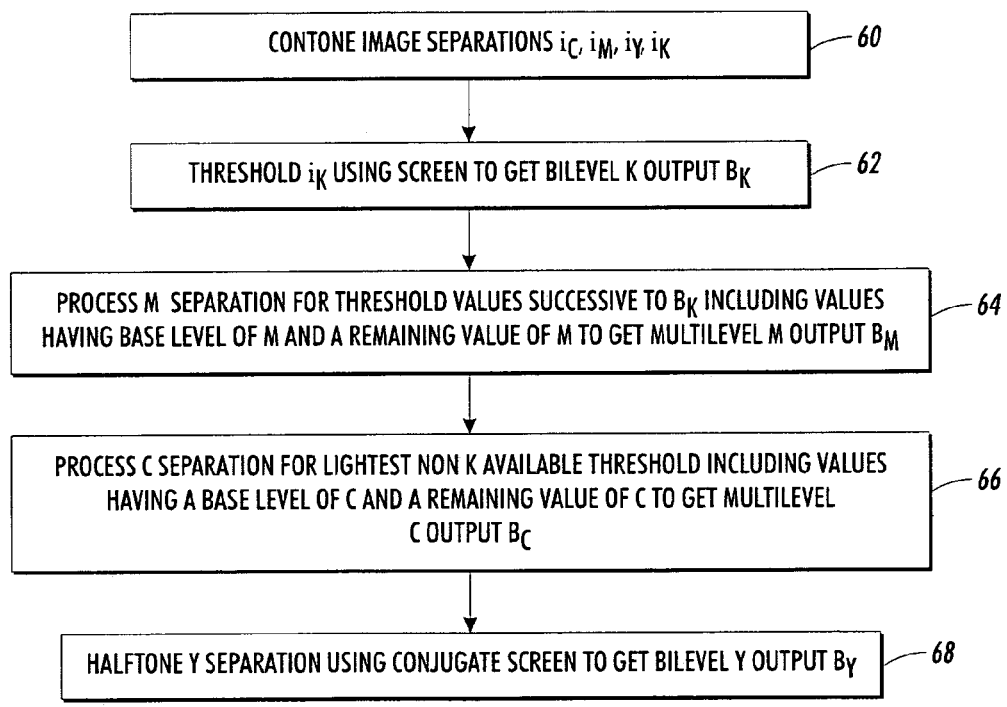
FIG. 4 is a flowchart illustrating the steps of the method of the subject invention.

Merely for purposes of example, and with reference to FIG. 4, consider the case when there are NC levels of Cyan and NM levels of Magenta for the multi-level printing (and K and Y are bi-level). For the following description, it will be assumed that the input image is an 8 bit image with values from 0 through 255 and the halftone screen threshold values take the values 1 through 255. The algorithm for multi-level successive-filling halftoning can be algorithmically described as follows:

---

1. Separate the image into CMYK contone separations $i_C(m,n)$, $i_M(m,n)$, $i_Y(m,n)$, $i_K(m,n)$.
Let the halftone screen be given by h(m,n) [Block 60]
2. Screen the K separation to get a binary K output $b_K(m,n)$:

If($i_K(m,n) > h(m,n)$) $b_K(m,n) = 1$, otherwise $b_K(m,n) = 0$. [Block 62]

-continued

3. If $b_K(m,n) = 0\{$
    Process Magenta Separation:
    Compute:
        Base level of Magenta as $l_M(m,n) = \lfloor(i_M(m,n) * NM/(255 - i_K(m,n))\rfloor$
        Remaining Magenta value as $d_M(m,n) = i_M(m,n) *NM - l_M(m,n) *(255- i_K(m,n))$
        Limit: $l_M(m,n) = min(l_M(m,n), NM)$
            if$(l_M(m,n)>=NM) d_M(m,n)=0$
    Determine Output Magenta value.
        If$((h(m,n) i_K(m,n)) \& (h(m,n) i_K(m,n)+ d_M(m,n,))) b_M(m,n,) = l_M(m,n,) + 1$
        else   $b_M(m,n) = l_M(m,n)$ [Block 64]
    Process Cyan Separation:
    Compute:
        Base level of Cyan as $l_C(m,n) = \lfloor(i_C(m,n) * NC/(255- i_K(m,n))\rfloor$
        Remaining Cyan value as $d_C(m,n) = i_C(m,n) *NC - l_C(m,n) *(255- i_K(m,n))$
        Limit: $l_C(m,n) = min(l_C(m,n), NC)$
            if$(l_C(m,n)>=NC) d_C(m,n)=0$
    Determine Output Cyan value:
        $b_C(m,n)=l_C(m,n)$ (Default value - potentially modified below)
        If$((d_M(m,n)+ d_C(m,n)<(255 - i_K(m,n)))\{$
            If$((h(m,n)>i_K(m,n)) + d_M(m,n)) \& (h(m,n)<= i_K(m,n)+ d_M(m,n)+$
$d_C(m,n))) b_C(m,n) = l_C(m,n)+1\}$
        else   if $(h(m,n)>=(255-d_C(m,n))) b_C(m,n) = l_C(m,n)+ 1$ [Block 66]
4. Halftone Y separation using "conjugate screen":
    If$(i_Y(m,n)>255-h(m,n)) b_Y(m,n) = 1$, otherwise $b_Y(m,n) = 0$ [Block 68]

In the algorithm description above the notation $\lfloor x \rfloor$ has been used to denote the floor value of x, i.e., the largest integer less than or equal to x.

Figure 3A:
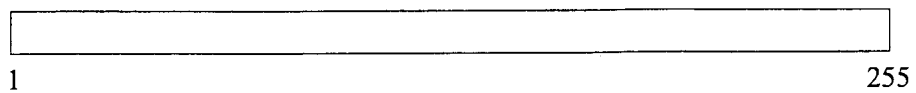
FIGS. 3A–3F comprise exemplary representations of color separation dot filling in terms of thresholds between 1 and 255, i.e., an 8-bit binary signal representation.

With reference to FIGS. 3A–3F, a better understanding of the operation of the above algorithm can be obtained by interpreting the stochastic screen as follows. The stochastic screen is (for instance) a 256×256 array of thresholds between 1 and 255. When halftoning an image (one separation), a pixel is turned on if the image value at that pixel exceeds the threshold. For a linear dot, when a constant image with value V is halftoned, the fraction of the pixels turned on in the output is V/255 (or the nearest obtainable approximation) for all values of V between 0 and 255. In order to illustrate the idea of this invention, we will represent the dot by its thresholds as shown in FIG. 3A. The linear array in FIG. 3A represents the thresholds of the dot in increasing order from let to right, going from 1 to 255. In this representation, each threshold represents all the pixels that get turned on just when the image reaches that value. Thus, a particular threshold or threshold region of the dot is filled by a given level of a separation to indicate that the dots of that level of that separation completely cover the pixels corresponding to that threshold/threshold region. The representation can also be interpreted as representing the available region of area coverage ranging from 0–100%.

Figure 3B:
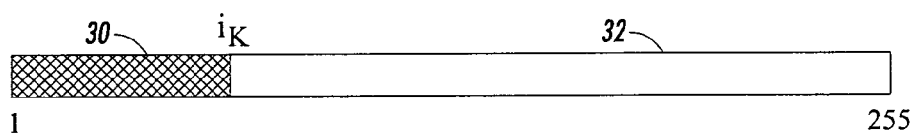

In the exemplary algorithm, the Black separation (K) is halftoned first by a simple comparison of the input image value to the value of the halftone screen threshold at the corresponding pixel location. The pixel is turned on if the image value exceeds the threshold and is off otherwise. Thus, if the input K value is $i_K$ the lowest levels 1 through $i_K$ 30 are occupied by Black pixels. The remaining levels 32 from $i_{K+1}$ to 255 are available for the subsequent separations. This is illustrated in FIG. 3B.

Figure 3C:
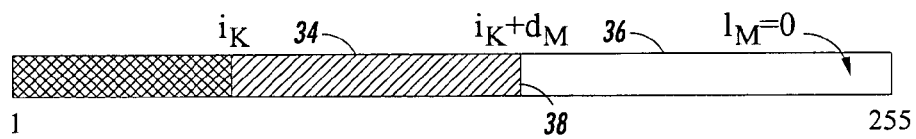
Figure 3D:
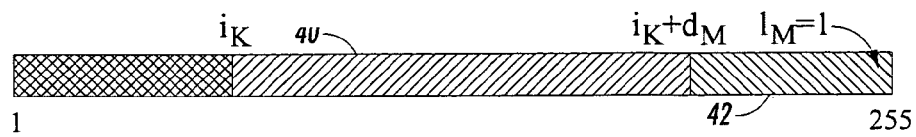

The next separation to be halftoned is Magenta. In order to result in the best halftone textures, the Magenta pixels should be distributed so as to fill the set of next available free thresholds 32 shown in FIG. 3B. However, there are additional considerations from the multi-level printing. The available threshold region for the Magenta separation is the range $i_{K+1}$ to 255 with a size of $(255-i_K)$. Since there are MC Magenta levels, in the absence of any other colorants (i.e., if $i_K=0$), Magenta values of 0 through 255/MC corresponds to 0% to 100% coverage at a 1 drop level, while values in the range 255/MC+1 through 255*2/MC correspond to 0% to 100% coverage at a 2 drop level (supplemental ink drops) with remaining pixels at one drop level and so on (note that the definition of the points corresponding to these multi-level boundaries can be modified if necessary). With the already present K, it is preferable to print the requested Magenta in the region of remaining thresholds 32 while avoiding overlaps with K (as far as possible). In order to avoid severely sacrificing the gamut at the lower end, it is preferable to go to a higher level of the multi-level Magenta output sooner instead of overlapping with Black The computation of the Magenta is therefore broken up into two parts as indicated in Step 3 of the algorithm as stated above. At any point, only two adjacent levels of Magenta are used A base level $l_M(m,n)$ is computed for the Magenta output. The entire region of available thresholds 32 (after the Black) is assured of having Magenta output at least at this level. The remainder Magenta coverage $d_M(m,n)$ is also computed and placed so as to occupy the thresholds adjacent to Black. In this implementation, overlap with Black is not allowed and excess requested coverage of Magenta (and Cyan) is ignored. This is typically the desirable state for inkjet printing where excess ink coverage is undesirable for a variety of reasons. If rich (overprinted) Black is desired, the algorithm proposed above can be readily modified to incorporate the change. FIGS. 3C and 3D indicate the occupancy of Black and Magenta in the threshold array. FIG. 3C illustrates the case when the requested Magenta value requires only the use of the lowest level (single drop) of Magenta, which occupy the thresholds between $i_K+1$ and $i_K+d_M$, 34. The region 36 is unoccupied by Magenta as $l_M=0$. The two regions are demarcated by the threshold value 38. FIG. 3D illustrates the case when the requested Magenta value requires the use of a base level, at $l_M=1$ (all non-black pixels have at least one drop of magenta) and some regions having additional Magenta (i.e., of the non black pixels a region of width $d_M$ thresholds actually has two drops). Region 40 represents the threshold values accomodating the remaining Magenta values (by having two drops applied), while region 42 only has base level of Magenta (1 drop).

The logic for the processing of Cyan separation is similar. The Cyan halftone computation is broken up into a base level that occupies the entire non-black region of thresholds and an additional value which is placed in the lightest non-black region available, i.e., occupies the levels above $i_K+d_M$ when it can be accommodated in those regions—otherwise the additional Cyan is allocated a region of contiguous thresholds covering the lightest non-black region and overlapping the Magenta so as to satisfy the requested area coverage requirement. These two cases are illustrated in FIG. 3E and FIG. 3F for the case in which the Black and Magenta levels correspond to FIG. 3D and the base level of Cyan is $1_C=0$.

Figure 3E:
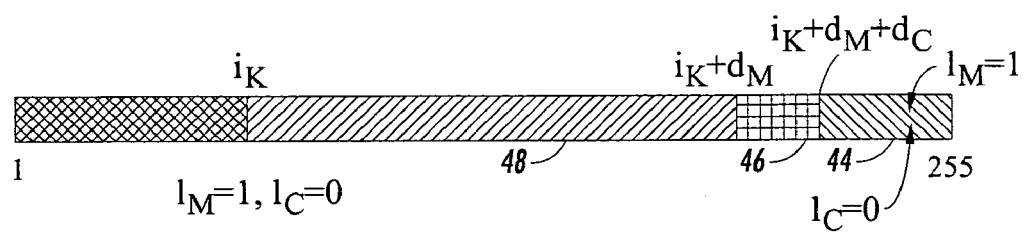
Figure 3F:
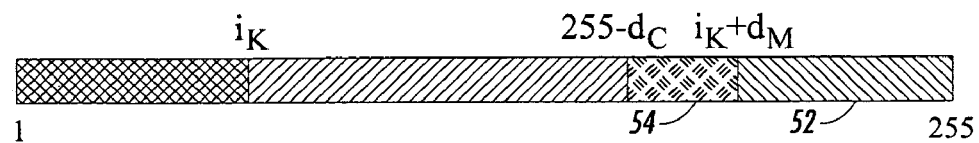

In FIG. 3E, region 44 represents an area only having the base level (single drops corresponding to $1_M=1$) of Magenta and no Cyan (corresponding to $1_C=0$). Region 46 comprises thresholds where Magenta and Cyan are overlapped but Magenta is at the base level of single drops and Cyan is at the single drop level. Region 48 comprises a region with two drops of Magenta and no Cyan. In FIG. 3F, region 52 has the same colorant overlap as region 46 of FIG. 3E, i.e., one drop level for both Magenta and Cyan, but region 54 also includes additional Cyan starting from a threshold value $(255-d_C)$ comprising the lightest non-black region from which the overlap need start to be adjacent to region 52.

Note that the preceding examples illustrate the placement of the K, M, and C colorants for a very limited number of the potential possibilities. The algorithm is however general and can handle arbitrary number of levels for the colorants and will produce corresponding multi-level output. Note also that in general the order of processing the separations need not necessarily correspond to the order of printing. The separations may first be rendered as per the present invention and then printed in any sequence.

The Yellow separation may be halftoned independently using a separate halftone screen for Y. Alternatively, as indicated in the above algorithm, the Yellow separation may be halftoned using the conjugate halftone screen defined as $(h'(m,n)=255-h(m,n))$. The use of the conjugate halftone screen avoids overlap of the printed Yellow dots with the printed Black dots.

The proposed algorithm processes image separations sequentially using a single halftone screen. For the purpose of illustrating the algorithm, its operation has been described for spatially uniform images, i.e., an image for which the values of the individual separations are constant. The actual algorithm is directly applicable to spatially varying images and can be applied on a pixel-by-pixel basis using only the color separation values for the pixel being processed without requiring buffering of neighboring pixel locations. The processing principles are applicable to any number of color separations and multiple levels of multi-level drop processing.

The invention has been described with reference to the preferred embodiment. Obviously, modifications and alterations will occur to others upon reading and understanding the proceeding detailed description. In particular, the rule of placing the dots for a new separation on lightest available region and in the lowest available thresholds may be satisfied in many different mathematically equivalent ways. For instance, instead of modifying the image, the threshold array may be modified by an equivalent amount, or instead of comparing a pixel to threshold the threshold may be added to the image and compared to a constant value. In addition, the modification amounts stated in the algorithm described earlier may be defined in several different mathematically equivalent ways. Also, while the invention has been described for specific application to a stochastic screen, its benefits of minimal overlap can also be realized for other types of screens. Finally, just like other halftoning methods the method of the present invention may also be utilized in display applications. It is intended that the invention be construed as including all such modifications and alterations insofar as they come within the scope of the appended claims or the equivalents thereof.

Having thus described the preferred embodiment, we now claim:

1. In a color output system, a method of rendering a color document with a multi-level halftone process using a single screen for a plurality of color separations wherein the screen is comprised of a plurality of pixel locations associated with successive threshold values, the method comprising rendering at least one of the color separations at a pixel location with a selected output value from allowed output levels, said selected output value being determined by an input color value for the separation at the pixel location, a maximum output value allowed, the halftone screen, and input color values of previously processed separations; and wherein the rendering of a successively processed separation outputs a requested color amount in a non black area using a plurality of output levels comprising a darker and a lighter output levels and wherein, the darker output level occupies lowest available threshold values of the screen at a highest luminance in the non black area, and the lighter output level occupies other available threshold values of the screen in the non black area adjacent to the darker output level.

2. The method as defined in claim 1 wherein the rendering of the at least one color separation is at pixel locations having threshold values successive to the threshold values of the previously printed colorants.

3. The method as defined in claim 2 wherein the color image includes a black separation which is rendered first.

4. The method as defined in claim 1 wherein the color separations comprise Black, Magenta, Cyan and Yellow, and the method comprises printing the Black separation with a bi-level process and at least one of the Magenta, Cyan and Yellow separations with a multi-level process.

5. The method as defined in claim 4 wherein the printing of the at least one of the separations with a multi-level process comprises selecting a pixel location for the printing in accordance with a filling algorithm including a multiple level factor and a successive filling factor for better dispersion and minimal overlap of drops.

6. The method as described in claim 5 wherein the multi-level process comprises using multiple colorant drops at each pixel location.

7. The method as defined in claim 6 further comprising printing a plurality of ink drops per pixel location for multiple level halftoning of the one color separation after filling of the pixel locations to a base level.

8. The method as defined in claim 7 wherein the printing of the plurality of ink drops for the one color separation comprises successively filling the pixel locations in accordance with increasing threshold values.

9. A method of rendering a contone image with CMYK halftone separations denoted $i_C(m,n)$, $i_M(m,n)$, $i_Y(m,n)$, and $i_K(m,n)$, respectively, by multiple level halftoning using a single halftone screen represented by $h(m,n)$ comprising steps of:

Screening the K separation to get a binary K output $b_K(m,n)$ as:

```
        If($i_K(m,n) > h(m,n)$) $b_K(m,n) = 1$, otherwise $b_K(m,n) = 0$.
    If $b_K(m,n) = 0${
    Processing the M separation:
    Computing:
        A base level of M as $l_M(m,n) = \angle(i_M(m,n) * NM/(255 - i_K(m,n)))\_/$,
        A remaining M value as $d_M(m,n) = i_M(m,n) *NM - l_M(m,n) *(255 - i_K(m,n))$
        Limiting:  $l_M(m,n) = \min(l_M(m,n), NM)$
            if($l_M(m,n) >= NM$) $d_M(m,n)=0$
    Determining an output M value:
        If($(h(m,n) > i_K(m,n))$ & $(h(m,n) < i_K(m,n) + d_M(m,n)))$ $b_M(m,n) = l_M(m,n)+1$
        else        $b_M(m,n) = l_M(m,n)$
    Processing the C separation:
    Computing:
        A base level of C as $l_C(m,n) = \angle(i_C(m,n) * NC/(255 - i_K(m,n)))\_/$
        A remaining C value as $d_C(m,n) = i_C(m,n) *NC - l_C(m,n) *(255 - i_K(m,n))$
        Limiting:  $l_C(m,n) = \min(l_C(m,n), NC)$
            if($l_C(m,n) >= NC$) $dc(m,n)=0$
    Determining an output C value:
        $b_C(m,n) = l_C(m,n)$ (Default value-potentially modified below)
        If($(d_M(m,n) + d_C(m,n) < (255 - i_K(m,n)))${
            If($(h(m,n) > i_K(m,n)) + d_M(m,n))$ & $(h(m,n) <= i_K(m,n) + d_M(m,n) + d_C(m,n)))$ $b_C(m,n) = l_C(m,n) + 1$}
            else      if ($h(m,n)$    $(255 - d_C(m,n))$ ) $b_C(m,n) = l_C(m,n) + 1$, and
    Halftoning the Y separation using an independent screen $h_Y(m,n)$:
        If($i_Y(m,n) > h_Y(m,n)$) $b_Y(m,n)=1$, otherwise $b_Y(m,n) = 0$.
```

10. The method as described in claim 9 wherein the independent screen for the Y separation is the "conjugate" of the screen used for other separations given by $h_Y(m,n) = 255 - h(m,n)$.

11. A method for printing a color contone image with a plurality of color separations using color dots selectively comprised of a plurality of ink drops of one or more colorants, comprising:
  printing at least one of the colorants with the plurality of ink drops at pixel locations identified by a screen, wherein a base level comprising a minimal application of the ink drops, is maximally dispersed at selected ones of the pixel locations defined by threshold values of the screen, and any remaining value comprising a supplemental application of the ink drops, is likewise successively assigned to the selected ones of the pixel locations: and,
  wherein the selected ones of the pixel locations are further defined as successive to other pixel locations of the screen previously assigned to a prior printed colorant; and,
  wherein the rendering of a successively processed separation outputs a requested color amount in a non black area using a plurality of output levels comprising a darker and a lighter output levels and wherein, the darker output level occupies lowest available threshold values of the screen at a highest luminance in the non black area, and the lighter output level occupies other available threshold values of the screen in the non black area adjacent to the darker output level.

12. A rendering apparatus for a color image represented in a halftone process by a plurality of color separations, comprising:
  a halftoning screen generator for producing a screen having threshold values at pixel locations, wherein the values can be applied to contone image signals to derive a binary or multiple level image signal suitable to drive the apparatus; and,
  a processor for rendering the color separations in accordance with the screen, wherein for constant image separation values, pixel locations are turned on for base and remaining level values of a color separation at the pixel locations disposed in a highest available luminance region having a lowest available threshold value; and
  wherein the processor renders a black separation first and other color separations thereafter, and wherein one of the other color separation comprises a printing of multiple ink drops at lowest available threshold values of the screen at a highest luminance in a non black rendered area of the screen, and a printing of a single ink drop at other available threshold values of the screen in the non black rendered area adjacent to the multiple ink drops printing.

* * * * *